(12) United States Patent
Foote et al.

(10) Patent No.: US 8,331,566 B1
(45) Date of Patent: Dec. 11, 2012

(54) MEDIA TRANSMISSION AND MANAGEMENT

(75) Inventors: William Frederick Foote, Los Angeles, CA (US); Jen Hsieh, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/303,040

(22) Filed: Nov. 22, 2011

Related U.S. Application Data

(60) Provisional application No. 61/560,774, filed on Nov. 16, 2011.

(51) Int. Cl.
*H04K 1/00* (2006.01)
(52) U.S. Cl. ......................................................... 380/255
(58) Field of Classification Search .................. 380/255, 380/286; 713/179, 180, 181; 382/299
See application file for complete search history.

(56) References Cited

U.S. PATENT DOCUMENTS

| | | | | |
|---|---|---|---|---|
| 6,343,350 | B1 * | 1/2002 | LaMaire et al. | 711/156 |
| 7,313,290 | B2 * | 12/2007 | Millman et al. | 382/299 |
| 7,499,188 | B2 | 3/2009 | Garcia | |
| 7,860,747 | B2 | 12/2010 | Bryant | |
| 2001/0026376 | A1 * | 10/2001 | I'Anson | 358/400 |
| 2002/0196986 | A1 * | 12/2002 | McIntyre | 382/299 |
| 2004/0172451 | A1 * | 9/2004 | Biggs et al. | 709/206 |
| 2005/0052685 | A1 * | 3/2005 | Herf et al. | 358/1.15 |
| 2005/0122345 | A1 * | 6/2005 | Kirn et al. | 345/629 |
| 2006/0092266 | A1 * | 5/2006 | Morgan | 348/14.01 |
| 2007/0035764 | A1 | 2/2007 | Aldrich et al. | |
| 2007/0234215 | A1 * | 10/2007 | Graham et al. | 715/723 |
| 2008/0235262 | A1 | 9/2008 | Holm et al. | |
| 2011/0197123 | A1 * | 8/2011 | Caine et al. | 715/234 |

OTHER PUBLICATIONS

"photos.upload," [online]. Facebook Developers 2011. First accessed on Nov. 4, 2011. Retrieved from the internet: <http://developers.facebook.com/docs/reference/rest/photos.upload> (7 pgs.).

* cited by examiner

*Primary Examiner* — Beemnet Dada
(74) *Attorney, Agent, or Firm* — Shumaker & Sieffert, P.A.

(57) ABSTRACT

In general, techniques and systems for transmitting media objects to a media sharing service are described. In one example, a method includes generating, by a computing device, a unique identifier that identifies a media object and is associated with a placeholder object, wherein the media object is of a higher fidelity than the placeholder object, and generating, by the computing device, a media share request that commands a media sharing service to create a network-accessible post, wherein the media share request comprises the unique identifier and the placeholder object. The method also includes transmitting the media share request to the media sharing service and subsequently transmitting the media object and the unique identifier to the media sharing service, wherein the unique identifier enables the media sharing service to replace the placeholder object in the network accessible post with the media object once the media object has been received.

22 Claims, 6 Drawing Sheets

MEDIA TRANSMISSION AND MANAGEMENT

This application claims the benefit of U.S. provisional application No. 61/560,774, filed Nov. 16, 2011, the entire content of which is incorporated herein by reference.

BACKGROUND

A user may interact, via a user interface, with applications executing on a computing device (e.g., mobile phone, tablet computer, smartphone). For instance, a user may interact with a user interface of a computing device to install, view, or delete an application stored at a memory of the computing device. In some instances, a user may use a mobile device (e.g., mobile phone, tablet computer, smartphone) to communicate with other devices or systems. For instance, a user may interact with a user interface of the mobile device to transmit information from the mobile device to a remote computing device. This transmitted information may be in the form of audio information, still image information, or video information.

In some examples, the mobile device may be capable of capturing images with a camera disposed on the mobile device. Some cameras include high-resolution sensors that are capable of capturing high-resolution images or videos with large file sizes. The user may interact with a user interface to capture images with the mobile device, store the images in a memory of the mobile device, and even share the images with other devices over a network. For example, the user may interact with the user interface to upload and post the images to a web-based photo service or social media service. In this manner, the user may share the images with other users and/or archive the images with the service.

SUMMARY

In one example, a method includes generating, by a computing device, a unique identifier that identifies a media object and is associated with a placeholder object, wherein the media object is of a higher fidelity than the placeholder object and generating, by the computing device, a media share request that commands a media sharing service to define a network-accessible post, wherein the media share request comprises the unique identifier and the placeholder object. The method also includes transmitting, by the computing device, the media share request to the media sharing service and subsequently transmitting, by the computing device, the media object and the unique identifier to the media sharing service, wherein the unique identifier enables the media sharing service to replace the placeholder object in the network-accessible post with the media object once the media object has been received.

In another example, a computer-readable storage medium is encoded with instructions that cause one or more processors of a mobile computing device to generate a second image from a first image, wherein the first image is of a higher resolution than the second image, generate a unique identifier that identifies the first image and is associated with the second image, generate a media share request that commands a media sharing service to define a network-accessible post, wherein the media share request comprises the unique identifier and the second image, transmit the media share request to the media sharing service, and subsequently transmit the first image and the unique identifier to the media sharing service, wherein the unique identifier enables the media sharing service to replace the second image in the network-accessible post with the first image once the first image has been received.

In another example, a system includes a data repository configured to store media objects and one or more servers configured to receive, via a network, a media share request comprising a placeholder object and a unique identifier, wherein the unique identifier is associated with the placeholder object and identifies a media object, and wherein the media object is of a higher fidelity than the placeholder object. The one or more servers are also configured to, responsive to receiving the media share request, generate a network-accessible post comprising the placeholder object, subsequent to receiving the media share request, receive, via the network, the media object and the unique identifier, store the associated media object in the data repository, and replace the placeholder object in the network-accessible post with the media object based on the unique identifier.

The details of one or more examples are set forth in the accompanying drawings and the description below. Other features, objects, and advantages will be apparent from the description and drawings, and from the claims.

DETAILED DESCRIPTION

Figure 1:
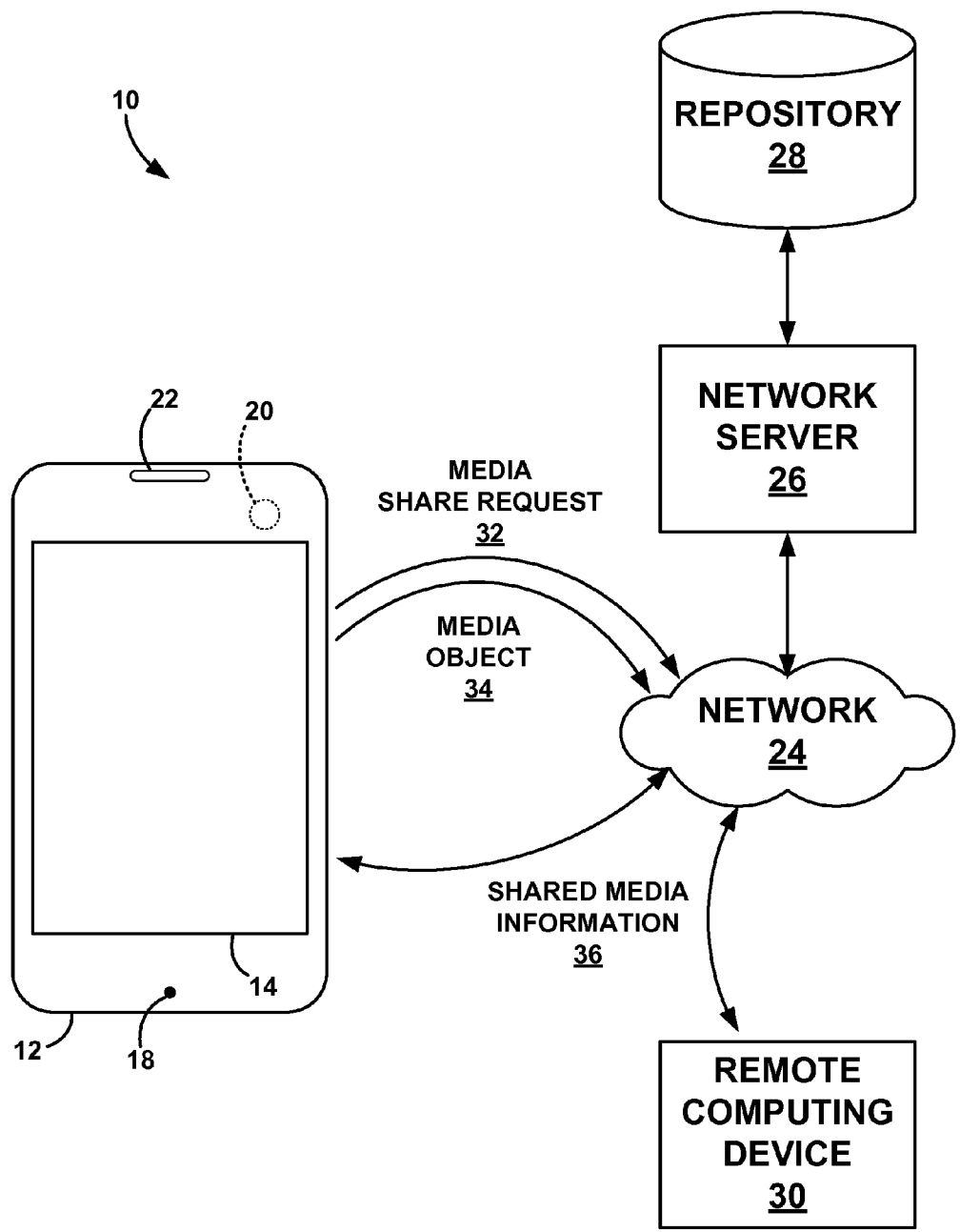
FIG. 1 is a conceptual diagram illustrating an example computing device that is configured to transmit a media share request and media object to a media sharing service, in accordance with one or more aspects of the present disclosure.

In general, this disclosure is directed to techniques for sharing media objects with a media sharing service. Typically, a user may interact with a user interface of a computing device to upload or otherwise transmit media objects (e.g., image files, video files, and audio files) to a server such that the media objects are accessible via the Internet or other network. The media objects may be made accessible by a networked service for the user and, in some examples, additional users. When using a computing device connected to a broadband network (e.g., a high-speed network), the computing device may be capable of uploading the media object in a relatively short time period.

However, it may take substantially longer to transmit media objects to the server when the computing device is a mobile phone or other mobile device connected to a cellular network or other low-speed network. In addition, mobile devices with high-definition cameras or other high-resolution sensors are capable of producing media objects with relatively large file sizes (e.g., file sizes greater than one megabyte, greater than ten megabytes, or even greater than one hundred megabytes). Transmitting media objects with large file sizes may take a relatively long time period (e.g., minutes or even hours) to complete and/or be expensive to transmit over a cellular network with limited data transmission quotas. Therefore, the user may not be able to quickly and efficiently create a post with the media object, or otherwise share the media object, using a mobile device.

Techniques of this disclosure may, in various instances, enable a computing device (e.g., a user device such as a mobile phone or a portable computing device) to quickly and efficiently create a network-accessible post for a media object without requiring the user to first upload the intended media object (e.g., the original or modified media object that the user desires to permanently include with the network-accessible post). The network-accessible post may be, in some examples, an addition of the media object in an account of a photo service, a defined location on a web-page for the media object, a stream of multiple media objects, or even a textual message added to a page of a social media service that includes the media object. The initial network-accessible post may include a placeholder object and a unique identifier. The unique identifier may be common to the placeholder object and the associated media object such that a server of the media sharing service may replace the placeholder object with media object once the media object is uploaded to the media sharing service. In this manner, the user may create the post by transmitting a minimal amount of data and utilize the media sharing service to update the post once the complete media object is eventually uploaded.

In one example, the user of a computing device may interact with a user interface of the computing device to take a snapshot or otherwise acquire a media object. The user may wish to share, distribute, or otherwise archive the media object using a networked media share service. The media share service may be a photo storage service, photo printing and sharing service, and/or a social media service. In other words, the media object may be posted alone or with text or other media selected by the user. In response to user input, the computing device may generate a placeholder object that is associated with the media object. The media object may generally be of a higher fidelity than the placeholder object. For example, the placeholder object may be a lower resolution image generated from the higher resolution media object. In another example, the placeholder object may be a frame from a video media object or an icon representative of the media object.

In addition, the computing device may generate a unique identifier that identifies the media object and is associated with the placeholder object. The unique identifier thus may be associated with both objects. In other words, a server may be capable of finding the unique identifier associated with the placeholder object, recognize that the unique identifier associated with the placeholder object also identifies the media object, and replace the placeholder object with the media object. In other examples, the unique identifier may be an identifier common to both the media object and the placeholder object. The computing device may then generate a media share request that includes the unique identifier and the placeholder object. After the media share request is generated, the computing device may transmit the media share request to the media share service via a network. Subsequently, the computing device may transmit the media object and the unique identifier to the media share service. The media object may be transmitted to the media sharing service using the same or different network than used to transmit the media share request.

In this manner, the media share service may generally generate or otherwise define the network-accessible post available with the placeholder object in less time than would otherwise be required for the media object to be finish uploading. As used herein, generating the network-accessible post may include creating, defining, publishing, or otherwise making the shared media accessible on a network. Once the media object has been fully received by the media share service, the service may replace the placeholder object in the post with the media object. The unique identifier enables the media share service to reconcile the placeholder object and the media object without regenerating the post or requiring further user input. Since the media object replaces the placeholder object in the post, this technique may also prevent any possible user confusion between the placeholder object and the intended media object because both objects are not simultaneously available to the user.

FIG. 1 is a conceptual diagram illustrating an example computing device 12 that is configured to transmit media share request 32 and media object 34 to a media sharing service using network 24. As shown in FIG. 1, system 10 includes computing device 12, network 24, network server 26, repository 28, and remote computing device 30. Computing device 12, in some examples, is or is a part of a portable computing device (e.g., a mobile phone, a netbook, a notebook, or a tablet device). In other examples, computing device 12 may be at least a part of a digital camera, a music player, or any other device that a user may carry or move between different locations. Computing device 12 may also connect to network 24 (e.g., a wired or wireless network). Although network 24 may be a single network, network 24 may be representative of two or more networks that allow computing device 12 to communicate with network server 26.

Computing device 12 may include user interface 14, rear camera 20, microphone 18, and speaker 22. User interface 14 may include one or more input devices and/or output devices so that the user can communicate with computing device 12. In one example, user interface 14 may be a touch screen interface. In other examples, user interface 14 may include a display and one or more buttons, pads, joysticks, mice, tactile device, or any other device capable of turning user actions into electrical signals that control computing device 12. In any example, the user may interact with user interface 14 to provide input prior to or during the processes described herein.

Rear camera 20 may allow computing device 12 to capture images (e.g., still images and/or video) of the environment surrounding computing device 12 such as people, landscapes, and objects. Rear camera 20 may include a sensor capable of generating high-resolution images. For example, the sensor may include more than one million pixels (a one megapixel sensor), more than five million pixels (a five megapixel sensor), or even more than ten million pixels (a ten megapixel sensor). In some examples, computing device 12 may include two or more cameras disposed on any surface of computing device 12 or coupled to computing device 12 using a cable. Alternatively, rear camera 20 may be placed on the front or other surface of computing device 12.

Microphone 18 may be configured to capture sound around computing device 12, such as user speech, speech from other people, and environmental sounds. Speaker 22 may be configured to generate and deliver audio to the user such as contact speech or other sounds. In some examples, computing device 12 may include more than one microphone 18 and speaker 22. Although microphone 18 and speaker 22 may be located on or within a housing of computing device 12, microphone 18 and/or speaker 22 may be electrically coupled to computing device 12 via one or more cables. Microphone 18 is an example of an audio input and speaker 22 is an example of an audio output. In other examples, computing device 12 may include additional, or alternative, audio inputs and audio outputs that include a sensor or direct electrical connection configured to accept audio from an attached device or deliver audio to an attached device.

As described herein, computing device 12 may be configured to upload or transmit placeholder objects and media objects to network server 26 for posting on a media sharing service. Upon receiving input from a user, computing device 12 may be configured to generate a unique identifier that identifies media object 34 and is associated with a placeholder object. Media object 34 may be of a higher fidelity (e.g., a higher resolution or larger media file) than the placeholder object. Computing device 12 may then generate media share request 32 that commands a media sharing service to define a network-accessible post. Media share request 32 may include the generated unique identifier and the placeholder object, and computing device 12 may transmit media share request 32 to the media sharing service.

Subsequent to the transmission of media share request 32, computing device 12 may transmit media object 34 and the unique identifier to the media sharing service via network 24. The transmitted unique identifier may enable the media sharing service (e.g., network server 26 and repository 28) to replace the placeholder object in the in network-accessible post with media object 34 once media object 34 has been received by network server 26 of the media sharing service. In other examples, computing device 12 may initiate the transmission of media object 34 during transmission of media share request 32 or simultaneously with initiation of the transmission of media share request 32.

Media object 34 may be one or more media files. Media object 34 may be an image file, a video file, or an audio file. For example, media object 34 may be a high-resolution image captured by rear camera 20. In other examples, media object 34 may be a high definition video (e.g., a video with each frame having a resolution of at least 1280 by 720 pixels). Computing device 12 may generate media object 34 with at least one sensor of computing device 12. For example, images may be generated with light sensor of rear camera 20. In other examples, a video may be generated with the light sensor of rear camera 20 and microphone 18. In some examples, multiple microphones may be used to generate stereo audio or multiple cameras may be used to generate images from multiple sources or 3D video. In this manner, media object 34 may include any type of media. In other examples, computing device 12 may obtain media object 34 from another device, e.g., download media object 34 from a website of remote computing device 30. Computing device 12 may produce (e.g., create through editing, combination, or other media manipulation on computing device) media object 34 from one or more other video objects recorded by computing device 12 and/or downloaded by computing device 12.

Computing device 12 may record or otherwise produce media objects (e.g., images or videos) with rear camera 20 and store the images in an internal memory and/or storage device. In some examples, computing device 12 may permanently record media objects collected by camera 20. However, computing device 12 may not permanently record media objects to prevent occupying all available data storage space with media objects—particularly when the media objects are stored within repository 28 of the media sharing service. In one example, computing device 12 may employ a "first-in and first-out" algorithm that allocates a pre-determined amount of storage space. When the storage space is filled, computing device 12 may erase the oldest media objects (e.g., the first stored image data) to make space for newly captured media objects. Although an older media object has been deleted, the most recent media object would still be retained in computing device 12. In some examples, only media objects transmitted to network server 26 may be deleted.

In general, video files (e.g., media objects) may include still images captured at a rate greater than approximately 15 images per second. For example, computing device 12 may generally capture (e.g., generate and/or record) video data having a frame rate between approximately 15 and 60 images per second. If necessary, computing device 12 may reduce the resolution of images captured by camera 20 in order to record at a desired video frame rate. Intermittent still images may be captured on a less frequent basis, generally less than approximately 15 images per second. For example, computing device 12 may capture intermittent still images using rear camera 20 at a rate generally greater than one image per minute but less than approximately 15 images per second. In one example, computing device 12 may capture intermittent images at a rate of approximately one image per second. In some examples, computing device 12 may capture intermittent still images at a higher resolution than the images of video data. In this manner, media objects may be a collection of images.

When the user desires to post or otherwise share media object 34 with the media sharing service (e.g., using network server 26), the user may provide an input to user interface 14 that requests computing device 12 generate media share request 32. Media share request 32 may include the request or data transmitted to network server 26 that commands network server 26 to create a network-accessible post for media object 34. The network-accessible post may be any posting in an account, web-page, or otherwise network-accessible domain that is intended to reference or include media object 34.

The network-accessible post for media object 34 may include varying shared media information 36. For example, shared media information may temporarily include a placeholder object until media object 34 is received by network server 26. In other examples, shared media information 36 may include media object 34 and text selected by the user. The text may be descriptive of media object 34 or media object 34 may be descriptive of the text provided by the user. In this manner, the network-accessible post may be a post on a social media service, a blog post, or any other presentation of information that may benefit from being created prior to the entire media object 34 being uploaded to network server 26.

Before computing device 12 transmits media share request 32 (e.g., responsive to the user input for the media share request 32), computing device 12 may generate the placeholder object based on media object 34. In one example, the placeholder object may be an icon or other non-specific image representative of media object 34. The icon may be an image of a camera to indicate media object 34 is an image, an image of a video camera to indicate media object 34 is a video, or an image of a microphone to indicate media object 34 is an audio file. However, the icon for the placeholder object may be any image having a lower resolution, or fidelity, than media object 34. Alternatively, the placeholder object may be a loading symbol or other icon that indicates media object 34 is still pending (e.g., media object 34 is not yet available).

In other examples, the placeholder object may be generated from media object 34. For example, the placeholder object may be a reduced-resolution image as compared to media object 34. Computing device 12 may generate the reduced-resolution image from media object 34 by reducing the resolution of media object 34. The reduced-resolution image may be scaled down to native resolution of user interface 14 or a specific file size limit imposed by computing device 12 and/or the media sharing service. Example reduced-resolution images may include a 640 by 480 pixel image or an image having a file size less than 50 kilobytes. In another example, the placeholder object may have a resolution of approximately 800 by 600 pixels (e.g., a common resolution for mobile devices) or less than approximately 0.5 megabytes in file size. In other examples, the placeholder object may have an even smaller resolution of approximately 100 by 100 pixels (e.g., a thumbnail image).

In another example, the placeholder object may be a frame (native or reduced resolution) selected from the video of media object 34. In any example, the placeholder object may have a lower fidelity, or quality, than that of media object 34. This lower fidelity generally indicates that the placeholder object has a smaller file size, than that of media object 34. In some examples, the placeholder object may have a file size less than a tenth, or less than a hundredth, the file size of media object 34. In addition, the placeholder object may be an image file, a video file, or an audio file.

Computing device 12 may generate the placeholder object (e.g., a reduced resolution image) according to the requirements (e.g., format requirements or resolution requirements) of the media sharing service. For example, the media sharing service may limit the placeholder object to a predetermined file size or a predetermined pixel height and width. These requirements may be stored in a memory of computing device 12, an application on computing device 12 associated with the media sharing service, or retrieved from network server 26 upon the initial user input specifying media share request 32. Computing device 12 may likewise utilize various other parameters specified by the media sharing service for transmission of one or both of media share request 32 and media object 34.

As described herein media object 34 may remain with the fidelity, or resolution, that it originally had when created by camera 20 or other sensor. However, in some examples, the fidelity of media object 34 may also be reduced. For example, the media sharing service may limit media object 34 to a predetermined resolution or file size. Computing device 12 may thus downsize media object 34 prior to transmission to network server 26. In one example, computing device 12 may downsize media object 34 to an image resolution no greater than 2048 by 2048 pixels. Although media object 34 may be reduced in resolution from the original object, media object 34 may still retain a higher fidelity than the associated placeholder object.

Computing device 12 may also generate the unique identifier associated with both the placeholder object and media object 34. In other words, the unique identifier is the same for the placeholder object and media object 34 to facilitate reconciliation between both objects. However, the placeholder object and/or media object 34 may be tagged with additional information such as flags indicating whether the object is of lower or higher resolution or whether replacement has yet been performed. The unique identifier generated by computing device 12 is generally distinctive to any other unique identifier used within the media sharing service. The parameters used to generate the unique identifier may ensure with a high degree of certainty that it will not be identical to any other unique identifier. In other words, although possible, the probability that the unique identifier could be generated for a different media object is exceedingly low and near impossible to occur.

Both of the placeholder object and media object 34 include, or are associated with the unique identifier. Both objects are transmitted with the unique identifier so that the media sharing service is capable of reconciling the presence of both objects. In other words, the unique identifier of the placeholder object can be matched to the unique identifier of media object 34, and the unique identifier of media object 34 can be matched to the unique identifier of the placeholder object. If only one of the objects included the unique identifier as a reference to the other object, then the reverse association cannot be made. For example, if only the placeholder object included the unique identifier as a reference to media object 34 and media object does not include or is not associated with the matching unique identifier, then the media sharing service would be unable to find the placeholder object once media object 34 is received by the media sharing service.

To ensure that the unique identifier is indeed unique to the media sharing service, computing device 12 may generate the unique identifier utilizing one or more distinctive aspects of media object 34. For example, computing device 12 may apply a hash function to media object 34. The hash function may map the data of the specific media object 34 to a smaller data set. Since the data, or bytes, of each media object are generally unique to that particular media (e.g., it is highly unlikely that two images would include all pixels of the exact same values), the unique identifier generated with the hash function should be unique to that each individual media object 34. In one example, the hash function may be a MD5 cryptographic hash function. The MD5 message-digest algorithm hash function may produce a 128-bit unique identifier or other value that such that billions, or even trillions, of media objects 34 can be managed by the media sharing service without duplicative unique identifiers.

The MD5 hash function, or other hash function, may also be used to reproduce the unique identifier from media object 34 if needed. Since the data of media object 34 is used to generate the unique identifier, the same hash function will produce the same unique identifier. In this manner, other examples of this technique may include transmitting media object 34 without the unique identifier and regenerating the unique identifier (e.g., a fingerprint of media object 34) at network server 26 using the same hash function as used by computing device 12.

In other examples, computing device 12 may generate the unique identifier with alternative aspects of media object 34. For example, computing device 12 may combine a time and date at which media object 34 was generated and a media access control (MAC) address of computing device 12 to generate the unique identifier. Since the MAC address is unique to computing device 12 and computing device 12 can only generate one media object of a specific type at any given time, the resulting unique identifier would not be duplicated by any other computing device using the media sharing service. Other unique aspects to the generation of media object 34 (e.g., the location or GPS coordinates of computing device 12 when the object was created or downloaded), computing device 12, or any other aspects may be utilized.

In some examples, computing device 12 may also flag the placeholder object as a lower fidelity object and/or flag media object 34 has a higher fidelity object. Network server 26 may use these one or more flags to confirm that only a lower fidelity object is replaced in the post by a higher fidelity object in instances where perhaps media object 34 is transmitted quickly and available when the post is initially generated. In other examples, these one or more flags may be set by network server 26 based on the information transmitted with the objects. In other words, network server 26 may identify the object sent with media share request 32 as the placeholder object.

The media share service may include network server 26 and repository 28. In addition, network server 26 may include one or more servers and repository 28 may include one or more data storage modules. The media share service may be any service, software, and/or hardware that enables media object 34 to be accessible over network 24, an intranet, the internet, or the web. In one example, the media share service may include a photo sharing service that enables multiple users to share images and/or videos with each other. In another example, the media share service may include a photo storage and/or printing service that allows the user to archive, alter, order physical prints, or otherwise manage media uploaded from computing device 12. In alternative examples, the media sharing service may include or be part of a social media service that shares text and media between users.

In some examples, the timing between transmitting media share request 32, and the placeholder object, and media object 34 may vary. For example, computing device 12 may begin initiating transmission of media object 34 and the unique identifier to the media sharing service immediately subsequent to completion of the media share request transmission. In other words, computing device 12 may transmit media share request 32 and media object 34 one at a time. In another example, computing device 12 may initiate transmission of media object 34 during the transmission of media share request 32. In other words, computing device 12 may simultaneously transmit media share request 32 and media object 34 to network server 26. In any event, the transmission of media share request 32 may generally complete prior to the completion of the media object 34 transmission.

However, it may be possible for media object 34 to complete transmission to network server 26 prior to media share request 32. This may occur if media object 34 is of relatively small size or media share request 32 is delayed or otherwise transmitted to network server 26 at a slower rate than that of media object 34. In this event, network server 26 may use the unique identifier common to media object 34 and media share request 32 to initially create the network-accessible post with media object 34. In other words, network server 26 may search for the unique identifier upon receiving media share request 32. If network server 26 locates media object 34 with the same unique identifier as the placeholder object in media share request 32, then network server 26 may replace the placeholder object and initially create the post with media object 34. Therefore, network server 26 may not need to replace the placeholder object in the post in this situation.

The transmission of media object 34 may alternatively be limited to using certain networks. For example, the user may desire that media object 34 is only transmitted when computing device 12 is connected to a high-speed network (e.g., a WiFi, WiMax, wireless local area network, 3G, 4G, etc., network). The user may also specific or approve one or more networks for transmission of media object 34. Since a cellular network may be expensive when transmitting data, the user may prefer to wait to upload media object 34 until computing device 12 is connected to a cheaper and/or faster network. In this manner, computing device 12 may only transmit media object 34 when computing device 12 detects the high-speed network, connects to the high-speed network, and responsive to the connection, transmits media object 34 to the media sharing service via the high-speed network.

In one example, computing device 12 may need to confirm that the detected high-speed network has been approved by the user to transmitting media object 34 before transmission is initiated. Computing device 12 may provide a set of preferences selectable by the user to approve one or more networks for transmitting media object 34. Without connection to an approved network in these examples, computing device 12 may wait to transmit media object 34 to network server 26. During this period, the network-accessible post will include the placeholder object instead of media object 34.

Once the network-accessible post is created by the media sharing service, computing device 12 or any other remote computing device 30 with access to the post may retrieve shared media information 36. Computing device 12 and remote computing device 30 may additionally upload comments, modifications, or otherwise add to the network-accessible post. Remote computing device 30 may be operated by the user of computing device 12 or a different user with authorization to view the network-accessible post and/or media object 34.

Although the process described herein may be applicable to any media types (e.g. images, movies, or audio), images may most commonly be transmitted as media object 34. Computing device 12 may include one or more processors and other components, and instructions stored in a memory that cause one or more processors to carry out these functions. In the image specific example, computing device 12 may generate a second image (e.g., a placeholder object) from a first image (e.g., media object 34), wherein the first image is of a higher resolution than the second image. Computing device 12 may also generate a unique identifier that identifies the first image and is associated with the second image and generate a media share request that commands a media sharing service to define a network-accessible post. The media share request may include the unique identifier and the second image, and computing device 12 may transmit media share request 32 to the media sharing service. In addition, computing device 12 may subsequently transmit the first image and the unique identifier to the media sharing service. Upon receipt of the first image, network server 26 may use the unique identifier to replace the second image in the in network-accessible post with the first image.

Transmission of media share request 32 and media object 34 may require a connection between computing device 12 and network server 26 using network 24. Both computing device 12 and network server 26 may connect to network 24. Network 24 may be embodied as one or more of the Internet, a wireless network, a wired network, a cellular network, or a fiber optic network. In other words, network 24 may be any data communication protocol or protocols that facilitate data transfer between two or more devices. Network server 26 may also connect to repository 28 for storing media share request 32, the placeholder object, and/or media object 34. Network server 26 and repository 28 may each include one or more servers or databases, respectively. In this manner, network server 26 and repository 28 may be embodied as any hardware necessary to receive media share request 32 and media object 34 and distribute shared media information 36 over network 24. Network server 26 may include one or more desktop computers, mainframes, minicomputers, or other computing devices capable of executing computer instructions and storing data. Repository 28 may include one or more memories, repositories, hard disks, or any other data storage device. In some examples, repository 28 may be included within network server 26.

Repository 28 may be included in, or described as, cloud storage. In other words, the placeholder media and/or media object 34 may be stored in one or more locations in the cloud (e.g., one or more repositories 28). Network server 26 may access the cloud and retrieve the desired placeholder media or media object 34 as requested by an authorized user, such as computing device 12 or remote computing device 30. In any case, media object 32 and other shared media information 36 may be stored remote from both computing device 12 and remote computing device 30. In some examples, repository 28 may include Relational Database Management System (RDBMS) software. In one example, repository 28 may be a relational database and accessed using a Structured Query Language (SQL) interface that is well known in the art. Repository 28 may alternatively be stored on a separate networked computing device and accessed by network server 26 through a network interface or system bus. Repository 28 may in other examples be an Object Database Management System (ODBMS), Online Analytical Processing (OLAP) database or other suitable data management system.

Remote computing device 30 may be any computing device configured to retrieve shared media information 36 or otherwise access the network-accessible post. Remote computing device 30 may be used by a user authorized to view media object 34 posted by the user of computing device 12. Although remote computing device 30 may have direct access to management of the post, remote computing device 30 may alternatively have limited rights to view and download media object 34 without authority to modify media object 34 or any shared media information 36 generated by other users. Remote computing device 30 may include a mobile device, tablet computing device, notebook computer, or workstation. In some examples, remote computing device 30 may include one or more servers, databases, and user interfaces configured to interact with the network-accessible post. Network server 26 may employ one or more security techniques to only allow authorized users and devices to access media object 34 associated with the network-accessible post. For example, the user of remote computing device 30 may be logged-in as a friend, family member, acquaintance, or another user authorized by the user who requests the post and uploaded media object 34.

Media object 34, or other data transmitted from computing device 12 to repository 28, may be stored indefinitely. However, in other examples, media object 34 may be deleted from repository 28 in response to receiving an authorized deletion request from an authorized user. Media object 34 may include private or sensitive information of the user. In response to the authorized deletion request, network server 26 may confirm the authorization of the user and, if authorized, permanently delete media object 34 from repository 28 and the media sharing service. Alternatively, network server 26 may manage the retention of media object 34 so that media object 34 is not stored longer than allowed by the media sharing service or until the user terminates an account with the media sharing service.

To facilitate the connection with networks and access-points to the media sharing service, computing device 12 may include a short-range communication module capable of communicating with various devices. Example short-range communication devices may include Bluetooth, WiFi, near field communication (NFC), or any other similar technology. The maximum distance between computing device 12 and the other device (e.g., the vicinity or envelope surrounding computing device 12), may be at least partially determined by the type of short-range communication used for the detection. In some instances, the maximum distance may be between approximately one meter and 100 meters. In one example, the maximum distance for the detection may be approximately 10 meters.

The media sharing service may include one or more servers or computing devices configured to manage the network-accessible post and reconcile the placeholder media with media object 34. Media sharing service may include, among other networking and computing hardware, a system of network server 26 and repository 28. As described herein, data repository 28 may be configured to store media objects from a user. Network server 26 may include one or more servers configured to receive, via network 24, media share request 32 from computing device 12. Media share request 32 may include a placeholder object and a unique identifier. The unique identifier may identify both the placeholder object and the associated media object 34, and the associated media object 34 may be of a higher fidelity than the placeholder object.

Responsive to the media share request, network server 26 may generate the network-accessible post that includes the placeholder object because the intended media object associated with the placeholder object has not yet been received by network server 26. Subsequent to receiving media share request 32, network server 26 may receive, via network 24, the associated media object 34 and the unique identifier. Network server 26 may store media object 34 in data repository 28 and replace the placeholder object in the network-accessible post with the associated media object 34 based on the unique identifier.

When network server 26 receives media object 34 and the unique identifier, network server 26 may search out and attempt to locate a matching unique identifier within the media sharing service. Network server 26 may utilize any search algorithms known in the art. If network server 26 finds a match, network server 26 may recognize that the unique identifier received with media share request 32 is the same as the unique identifier received with associated media object 34. That match may trigger network server 26 to update the network-accessible post. In response to the recognition of the matching unique identifiers, network server 26 may replace the placeholder object in the network-accessible post with the associated media object 34. Therefore, reconciliation with the unique identifier automatically modifies or updates the post, as intended by the user of computing device 12, upon receiving media object 34.

In some examples, network server 26 may be configured to delete the placeholder object when replacing the placeholder object with associated media object 34. The placeholder object may be a low resolution representation of media object 34 or otherwise subordinate file to that of media object 34. Therefore, network server 26 may delete or erase the placeholder object from any storage device of the media sharing service. However, the media sharing service may keep a record that confirms the replacement occurred and that media object 34 has indeed been inserted into the post.

The media sharing service may perform the object reconciliation automatically and in the background without notifying the user of any tasks or changes to the network-accessible post. In other examples, the media sharing service may notify computing device 12 of certain events associated with media object 34. For example, network server 26 may notify the user that media object 34 has replaced the placeholder object. This notification may occur through an individual message sent to the user of computing device 12 or a flag provided in the user account. Alternatively, the replacement of the placeholder object may alter one or more characteristics of the network-accessible post. The post may change color, remove a temporary indication for the placeholder object, or otherwise indicate to the original user and/or other users when media object 34 is included or referenced in the post.

Various aspects of the disclosure may be operable only when the user has explicitly enabled such functionality. In addition, various aspects of the disclosure may be disabled by the user. Thus, a user may elect to prevent computing device 12 from transmitting media share request 32, media object 34, or any identifiable information without confirmation from the user. More generally, privacy controls may be applied to all aspects of the disclosure based on a user's privacy preferences to honor the user's privacy preferences for opting in or opting out of the functionality described in this disclosure.

Figure 2:
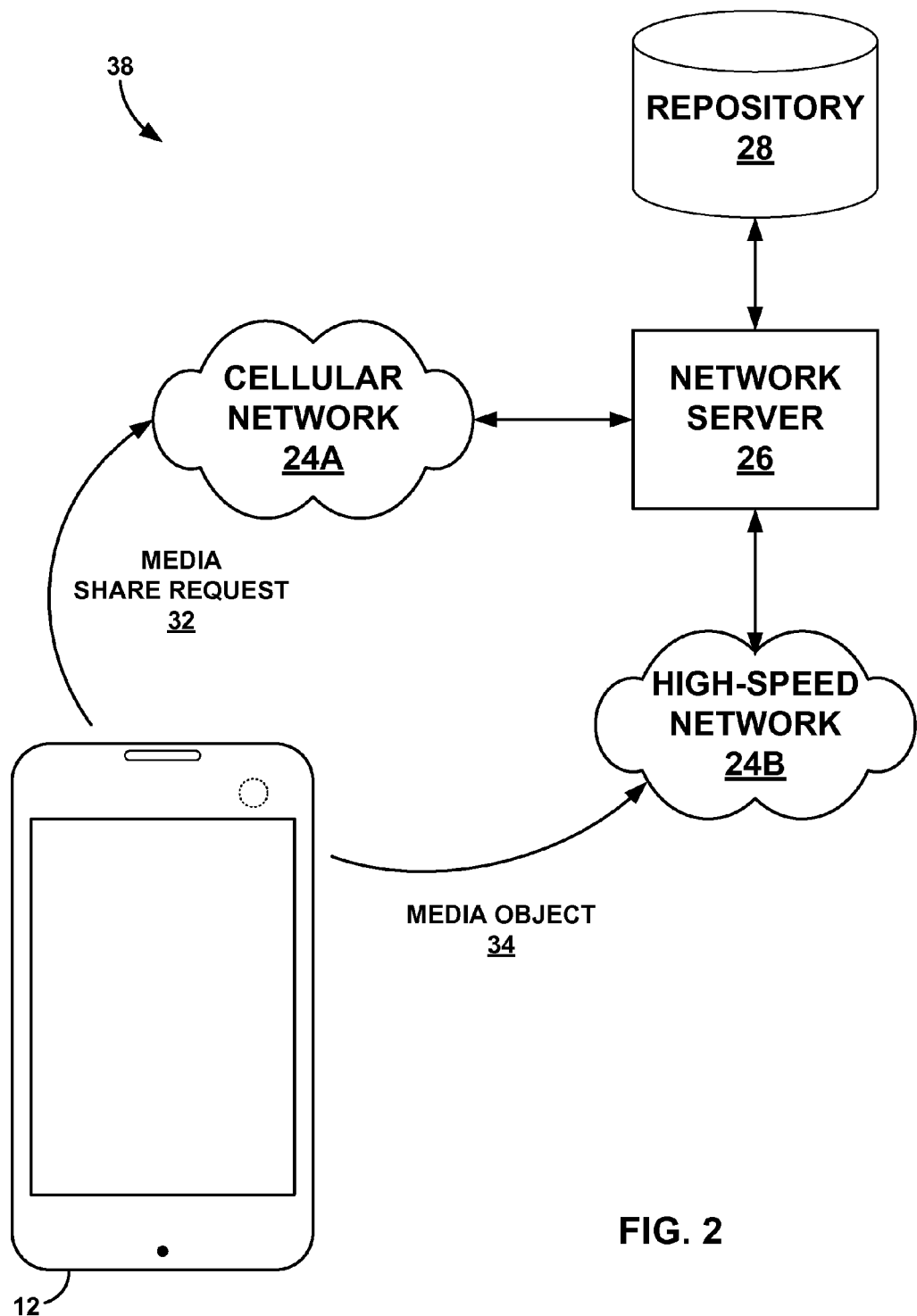
FIG. 2 is a conceptual diagram illustrating an example computing device that is configured to transmit a media share request to a media sharing service via a cellular network and a media object over to the media sharing service via a high-speed network.

FIG. 2 is a conceptual diagram illustrating an example computing device 12 that is configured to transmit media share request 32 to a media sharing service via cellular network 24A and media object 34 to the media sharing service via high-speed network 24B. System 38 is substantially similar to system 10 of FIG. 1. However, computing device 12 may utilize multiple networks 24A and 24B to transmit the data for the network-accessible post instead of a single network. These multiple networks may be used by necessity based on what networks are available to computing device 12 or by preferences set by the user.

As shown in FIG. 2, system 38 includes computing device 12, cellular network 24A, high-speed 24B, network server 26, and repository 28. Computing device 12 may separate certain tasks for transmitting data related to the network-accessible post to the media sharing service and network server 26. For example, computing device 12 may transmit the media share request 32 to network server 26 via cellular network 24A. Media share request 32 may contain a limited amount of data for only the placeholder object and perhaps some text. This relatively small amount of data may be transmitted quickly over a cellular network 24A. Cellular network 24A may transmit data according to various wireless protocols. Cellular network 24A is just one example of a network over which the user does not desire to transmit media object 24. Alternatively, cellular network 24A be any other relatively slow, expensive, and/or intermittent network.

However, media object 34 may contain a substantially greater amount of data than media share request 32. Transmitting media object 34 over cellular network 24A may require a long duration of time to complete. In addition, data transfer rates for cellular network 24A may be expensive and the user may not want to pay higher fees to transfer media object 34 over cellular network 24A. Therefore, the user may specify that media object 34 is to be transferred only using one or more specific networks, such as high-speed network 24B. Not only may high-speed network 24B transfer the larger file sizes of media object 34, but high-speed network 24B may be less expensive to use or have larger data transfer limits. For example, high-speed network 24B may be a WiFi network, wireless local area network, wired network, 4G wireless network, or any other network selected by the user. In other examples, media share request 32 may also be transmitted using high-speed network 24B.

Computing device 12 may store preferences by the user for which networks may be used to transfer media object 34. In this manner, computing device 12 may automatically transmit media object 34 over any connected network approved by the user. In other examples, the user may allow media object 34 to be transferred over cellular network 24A when certain conditions exist. For example, computing device 12 may be permitted to transfer media object 34 over cellular network 24A if transfer speeds are detected to be above a predetermined speed threshold or sufficient such that media object 34 can be transmitted within a predetermined time period. The predetermined speed threshold may be, as examples, 1.0 megabits per second or 5.0 megabits per second. The predetermined time period may be, as examples, less than 5 minutes or less than 1 minute. The user, or the media sharing service, may manage these different thresholds. Alternatively, computing device 12 may monitor the amount of data remaining on the user's data plan over cellular network 24A before transmitting media object 34. If transmitting media object 34 would not exceed the remaining data, computing device 12 may be permitted to transfer media object 34. In this manner, the networks available to computing device 12 may be flexible and changing based on one or more conditions. In any case, transmitting the placeholder object prior to media object 34 may provide this flexibility without delaying generation of the post.

Figure 3:
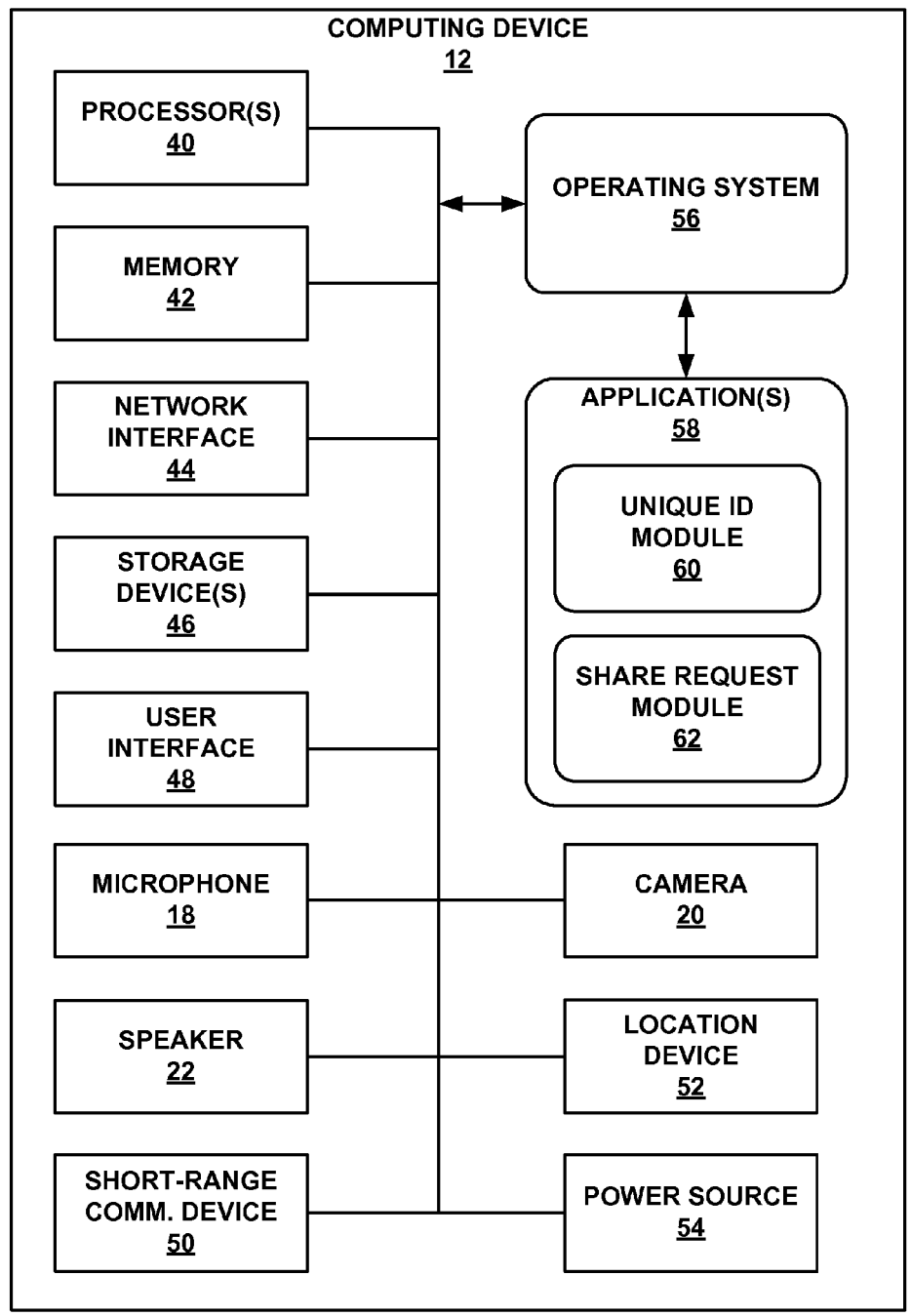
FIG. 3 is a block diagram illustrating components of one example of the computing device shown in FIG. 1.

FIG. 3 is a block diagram illustrating components of example computing device 12. FIG. 2 illustrates only one particular example of computing device 12, and many other example embodiments of computing device 12 may be used in other instances. For example, computing device 12 may include additional components and run multiple different applications.

As shown in the specific example of FIG. 3, computing device 12 includes one or more processors 40, memory 42, a network interface 44, one or more storage devices 46, user interface 48, microphone 18, speaker 22, short-range communication device 50, camera 20, location device 52, and power source 54. Computing device 12 also includes an operating system 56, which may include modules and/or applications that are executable by processors 40 and computing device 12. Computing device 12, in one example, further includes one or more applications 58. One or more applications 58, such as unique identifier (ID) module 60 and share request module 62, are also executable by computing device 12. Each of components 18, 20, 22, 40, 42, 44, 46, 48, 50, 52, 54, 56, and 58 may be interconnected (physically, communicatively, and/or operatively) for inter-component communications.

Processors 40, in one example, are configured to implement functionality and/or process instructions for execution within computing device 12. For example, processors 40 may be capable of processing instructions stored in memory 42 or instructions stored on storage devices 46. These instructions may define or otherwise control the operation of operating system 56 and application 58. Application 58 may control all of the transmission and generation of shared media information (e.g., media share request 32, media object 34, text, etc.). In other examples, multiple applications 58 may control the posting process described herein such that each application controls one or more aspect of the entire process (e.g., one application may control generating placeholder objects and another application may control transmission of placeholder objects, unique identifiers, and media objects to network server 26).

As shown in FIG. 3, applications 58 may include two modules that may be used to generate the necessary data for network-accessible posts. Unique ID module 60 may generate the unique identifier for the placeholder object and the associated media object. Share request module 62 may generate media share request 32 that commands the media sharing service to define the network-accessible post with the placeholder object and the unique identifier. In other examples, more or fewer discrete modules may be used to perform the process described herein. For example, applications 58 may also include one or more modules that process and render shared media information 36. Although modules 60 and 62 may be software modules, modules 60 and 62 may alternatively be at least partially implemented as hardware.

Memory 42, in one example, is configured to store information within computing device 12 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 12 (e.g., one or more of applications 58) to temporarily store information during program execution.

Storage devices 46, in some examples, also include one or more computer-readable storage media. Storage devices 46 may be configured to store larger amounts of information than memory 42 (e.g., media objects). Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 12, in some examples, also includes a network interface 44. Computing device 12, in one example, utilizes network interface 44 to communicate with external devices via one or more networks, such as network 24 in FIG. 1. Network interface 44 may be a network interface card, such as an Ethernet card, an optical transceiver, a radio frequency transceiver, or any other type of device that can send and receive information. Other examples of such network interfaces may include Bluetooth, 3G, 4G, and WiFi radios in mobile computing devices as well as USB. In some examples, computing device 12 utilizes network interface 44 to wirelessly communicate with external devices (e.g., network server 26 or remote computing device 30) such as a server, mobile phone, or other networked computing device. As described herein, network interface 44 may be configured to transmit media share request 32 and media object 34 to the media sharing service (e.g., network server 26 and repository 28) over network 24 as instructed by application 58 and/or processors 40.

Computing device 12, in one example, also includes one or more user interfaces 48. User interface 48 may be an example of user interface 14 described in FIG. 1. User interface 48 may be configured to receive input from a user (e.g., tactile, audio, or video feedback). User interface 48 may include a touch-sensitive and/or a presence-sensitive screen, mouse, a keyboard, a voice responsive system, or any other type of device for detecting a command from a user. In some examples, user interface 48 includes a touch-sensitive screen, mouse, keyboard, microphone, or camera.

User interface 48 may also include, combined or separate from input devices, output devices. In this manner, user interface 48 may be configured to provide output to a user using tactile, audio, or video stimuli. In one example, user interface 48 may include a touch-sensitive screen, sound card, a video graphics adapter card, or any other type of device for converting a signal into an appropriate form understandable to humans or machines. In addition, user interface 48 may include a speaker, a cathode ray tube (CRT) monitor, a liquid crystal display (LCD), or any other type of device that can generate intelligible output to a user.

As described in FIG. 1, computing device 12 also includes microphone 18, rear camera 20, and speaker 22. Camera 20 may be controlled by processors 40. In addition, processors 40 may control microphone 18 and speaker 22. Processors 40 may enable recording from microphone 18 and transmitting this audio as a media object or combining the audio into a video file as a media object. Processors 40 may also deliver audio data over speaker 22. Control of camera 20, microphone 18, and speaker 22 may be performed by processors 40 according to instructions stored in memory 42, storage devices 46, and/or other software modules (e.g., operating system 56 or applications 58). In addition, processors 40 may control additional cameras, microphones (e.g., a microphone positioned to detect sound from another direction than that of microphone 18), or speakers associated or disposed on computing device 12.

Computing device 12 may also include one or more short-range communication device 50. Short-range communication device 50 may include one or more modules configured to communicate via Bluetooth, WiFi, Ultra-Wideband radio or NFC, for example. Processors 40 may control short-range communication device 50 to detect third-party computing devices or any other device capable of communication with computing device 12. In some examples, computing device 12 may be configured to transmit media object 34 and/or media share request 32 to network server 26 using short-range communication device 50.

Computing device 12 may also include one of more location device 52. Location device 52 may include one or more satellite radios (e.g., a global positioning system (GPS) radio) capable of determining the geographical location of computing device 12. Computing device 12 may utilize location device 52 to confirm the location of the computing device 12, identify which networks may be available to computing device 12, or even generate the unique identifier based on coordinates determined during acquisition of media object 34. Alternatively, location device 52 may utilize triangulation or other such techniques to determine the location of computing device 12 based on known geographical positions of network towers, network access points, or any other device that may communication with computing device 12.

Computing device 12, in some examples, includes one or more power sources 54 such as a rechargeable battery that may provide power to computing device 12. Power sources 54, in some examples, may be made from nickel-cadmium, lithium-ion, or other suitable materials. In other examples, power sources 54 may be capable of providing stored power or voltage from another stored energy (e.g., fuel cells or capacitors).

Computing device 12 may also include operating system 56. Operating system 56, in some examples, controls the operation of components of computing device 12. For example, operating system 56, in one example, facilitates the interaction of application 58 with processors 40, memory 42, network interface 44, storage device 46, user interface 48, microphone 18, speaker 22, camera 20, short-range communication device 50, and location device 52.

Application 58 may be a software and/or hardware module that controls the posting process described herein. Application 58 may receive media object 34, generate the unique identifier, the placeholder object, and media share request 32, and manage the transmission of media share request 32 and media object 34 to the media sharing service. Application 58 may provide commands to processors 40 to control any of the components of computing device 12 as needed during any aspect of the process. Although application 58 may be software independent from operating system 56, application 58 may be a sub-routine of operating system 56 in other examples. Application 58 may also include sub-modules that execute various aspects of the posting and transmission process. In some examples, the user may be required to initiate application 58 by selecting the application from a list of applications stored on computing device 12. Alternatively, application 58 may automatically launch upon the initial generation of media object 34 (e.g., capturing an image with camera 20).

Computing device 12 may include additional components or sensors to perform functionality described herein. For example, computing device 12 may include one or more accelerometers to detect accelerations of computing device 12. Any applications or modules (e.g., application 58) implemented within or executed by computing device 12 may be implemented or contained within, operable by, executed by, and/or be operatively/communicatively coupled to components of computing device 12 (e.g., processors 40, memory 42, network interface 44, and/or storage devices 46).

Figure 4:
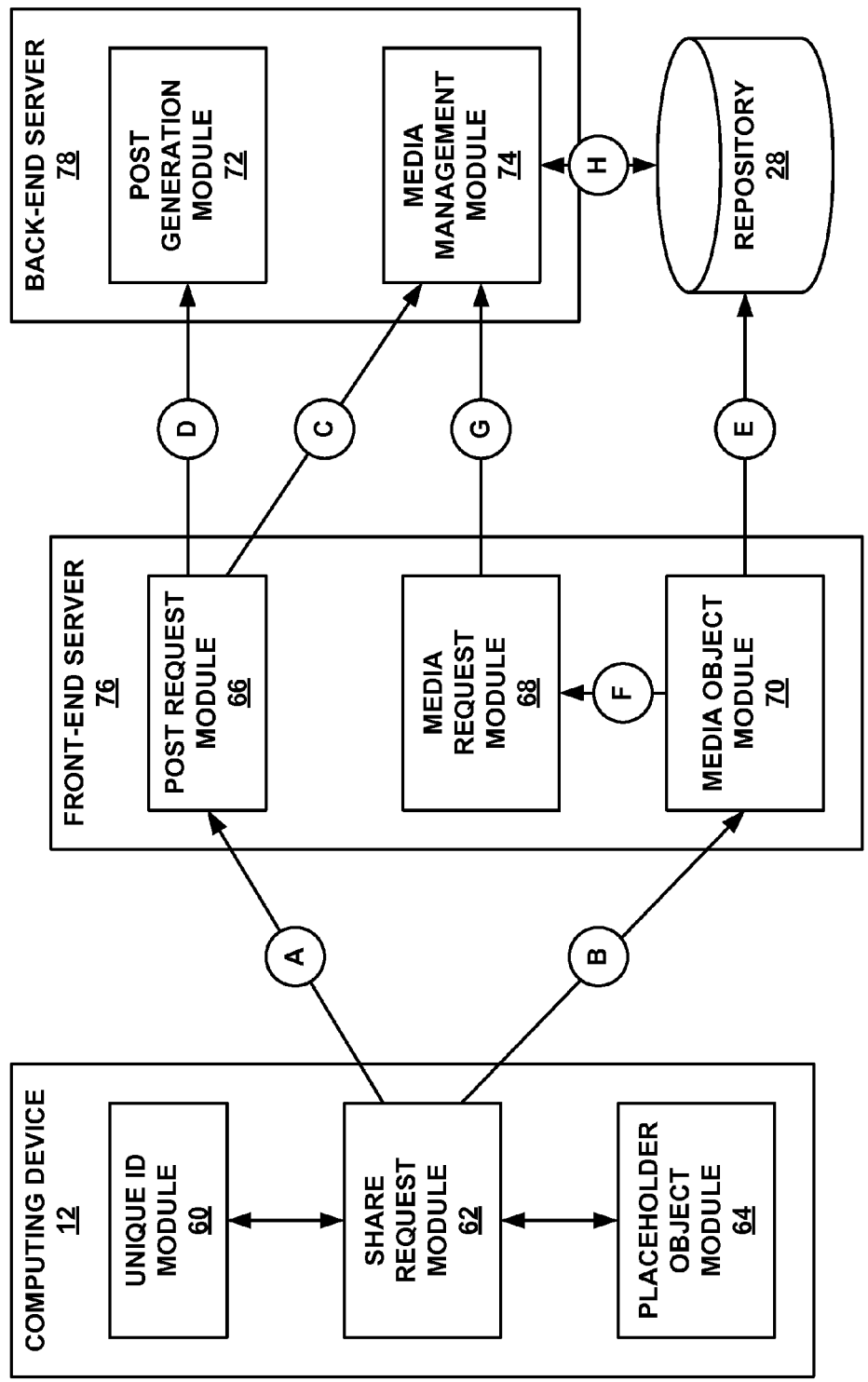
FIG. 4 is a block diagram illustrating components of an example computing device and multiple servers associated with a media sharing service.

FIG. 4 is a block diagram illustrating components of example computing device 12 and multiple servers associated with the media sharing service. Front-end server 76 and back-end server 78 may perform the tasks described above with respect to network server 26. In addition, each of front-end server 76 and back-end server 78 may include more than one servers. As shown in the example of FIG. 4, computing device 12 may communicate with front-end server 76 and front-end server 76 may communication with back-end server 78. Together, computing device 12, front-end server 76, and back-end server 78 may function to create the network-accessible post and replace the placeholder object with media object 34. The media sharing server may encompass one, multiple, or all of the processes of front-end server 76 and back-end server 78.

Computing device 12 may include unique ID module 60, share request module 62, and placeholder object module 64. Unique ID module 60 may generate the unique identifier based on media object 34. The unique identifier is then included with or otherwise associated witch each of the placeholder object and media object 34. Placeholder object module 64 may generate the placeholder object from media object 34. For example, placeholder object module 64 may reduce the resolution of an image (when media object 34 is an image) or select a frame from a video (when media object 34 is a video) to generate the placeholder object. The placeholder object thus has a lower fidelity than that of media object 34. Share request module 62 may then generate media share request 32 for transmission to front-end server 76. Share request module 62 may also manage transmission of media object 34.

Share request module 62, or another module or application of computing device 12, may transmit media share request 32 (A) to post request module 66 of front-end server 76. Post request module 66 may then generate and send a post request and the placeholder object (D) to post generation module 72 at back-end server 78. Post generation module 72 may then generate the network-accessible post and include the placeholder object. Post request module 66 may also send a share request (C) of the placeholder object and the unique identifier to media management module 74 of back-end server 78. Media management module 74 may manage and reconcile the placeholder object and media object 34. Media management module 74 may store the placeholder object and unique identifier in repository 28. After these steps, back-end server 78 has made the placeholder object available to users in the network-accessible post.

Once media share request 32 is has finished uploading to front-end server 76, share request module 62 may initiate transmission of media object 34 and unique identifier (B) to media object module 70 of front-end server 76. Media object module 70 may then store media object 34 in repository 28 with the unique identifier. Media object module 70 may then create media object 34 with the unique identifier (F) and send it to media request module 68. Media request module 68 may then interface with media management module 74 of back-end server 78 by sending a media request (G) to media management module 74.

Media management module 74 may perform the reconciliation between the placeholder object and media object 34 based on matching unique identifiers. For example, media management module 74 may search for a matching unique identifier associated with a placeholder object in repository 28 upon receiving media object 34 from media request module 68. If media management module 74 recognizes a matching unique identifier to the placeholder object repository 28, media management module 74 may locate the post that includes the placeholder object and replace the current object (e.g., the placeholder object) with the newly matching object (e.g., media object 34) stored in repository 28 (H). Since back-end server 78 may perform the replacement, the user may not need to intervene or otherwise pay attention to the eventual insertion of media object 34. If media object 34 is never uploaded to media object module 70, then the network-accessible post may continually contain the placeholder object. Although media object 34 is described as replacing the placeholder object in the network-accessible post, a link in the post to the placeholder object may instead be replaced with a link to media object 34 stored in repository 28.

Although each step A through H of FIG. 4 may be performed in a single order, two or more steps may be performed simultaneously. In addition, the order of steps may be different based on the configuration of front-end and back-end servers, the transmission duration for media share request 32 and media object 34, or other variables. The arrangement of modules and servers 76 and 78 are provided as one example. However, different arrangements are also considered. For example, one or more servers may handle each of modules 66, 68, and 70, 72, and/or 74. Each module of servers 76 and 78 may utilize one or more processors that perform the tasks as requested by the module. In any configuration, the management of placeholder objects and associated media objects may be performed remote from computing device 12.

Figure 5:
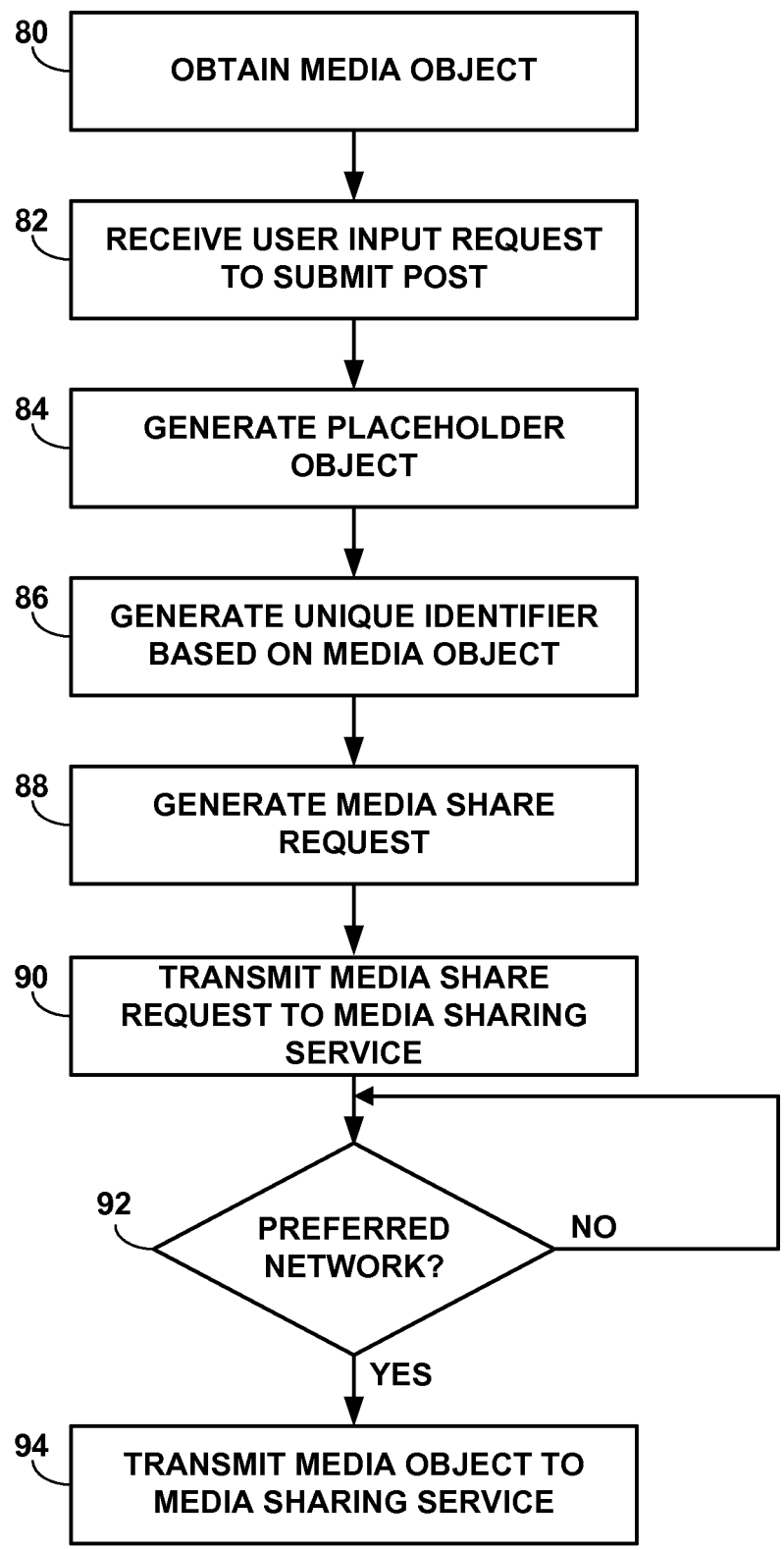
FIG. 5 is a flow diagram illustrating an example process that may be performed by a computing device to generate and transmit a unique identifier with both a placeholder object and an associated media object to facilitate replacement of the placeholder object with the media object in a network-accessible post.

FIG. 5 is a flow diagram illustrating an example process that may be performed by a computing device, such as computing device 12, to generate and transmit a unique identifier with both a placeholder object and an associated media object to facilitate generation of a network-accessible post. For purposes of illustration only, processor 40 of computing device 12 will be described as performing the process of FIG. 5. However, in some examples, processor 40 may include two or more processors and processor 40 may be controlled by one or more applications 58 and associated modules.

As shown in FIG. 5, the process may begin with processor 40 obtaining media object 34 (80). Processor 40 may obtain media object 40 from camera 20, other sensors, or from a networked device. Processor 40 may then receive user input from user interface 48 that requests processor 40 to submit a network-accessible post creation and publication request to the media sharing service (82). Processor 40 may then generate a placeholder object based on media object 34 (84). For example, processor 40 may generate a reduced-resolution object from the high-resolution media object 34. Processor 40 may also generate a unique identifier based on media object 34 (86). The unique identifier may be generated by applying a hash function to the data, or bytes, of media object 34, in one example.

After the unique identifier and the placeholder object have been generated, processor 40 may generate media share request 32 (88). Media share request 32 may include the unique identifier, the placeholder object, and any objects, text, or information desired by the user. Media share request 32 may, in some examples, have a size limit to facilitate quick transmission to the media sharing service.

Processor 40 then commands network interface 44 to transmit media share request 32 to the media sharing service (e.g. network server 26) over network 24 (90). If network 24, or another network, is a preferred network for transmitting media object 34 ("YES" branch of block 92), the processor 40 may command network interface 44 to transmit media object 34 and the unique identifier over the preferred network (94). Although transmission of media object 34 may be interrupted if the network connection is lost, network interface 44 may be configured to continue transmission when the network connection is reestablished. If the network is not preferred ("NO" branch of block 92), processor 40 may wait until a preferred network is detected to transmit media object 34. As described herein, a preferred network may be a network that has been identified by the user of computing device 12 and/or the media sharing service to be used for transmission of media object 34.

As described herein, a network may be sufficient when characteristics of the network satisfy user or media sharing service are acceptable or approved for transmitting media object 34. For example, a network may be sufficient when the transfer speeds are above a predetermined speed threshold. In another example, a network may be sufficient when it has been approved by the user for use in transmitting media object 34. Therefore, the sufficiency may relate to any characteristic of the network, not merely technical sufficiency for transmission of media object 34. One or more steps in the process of FIG. 5 may be optional, and in other examples, one or more additional steps may be added to this process consistent with the description herein.

Figure 6:
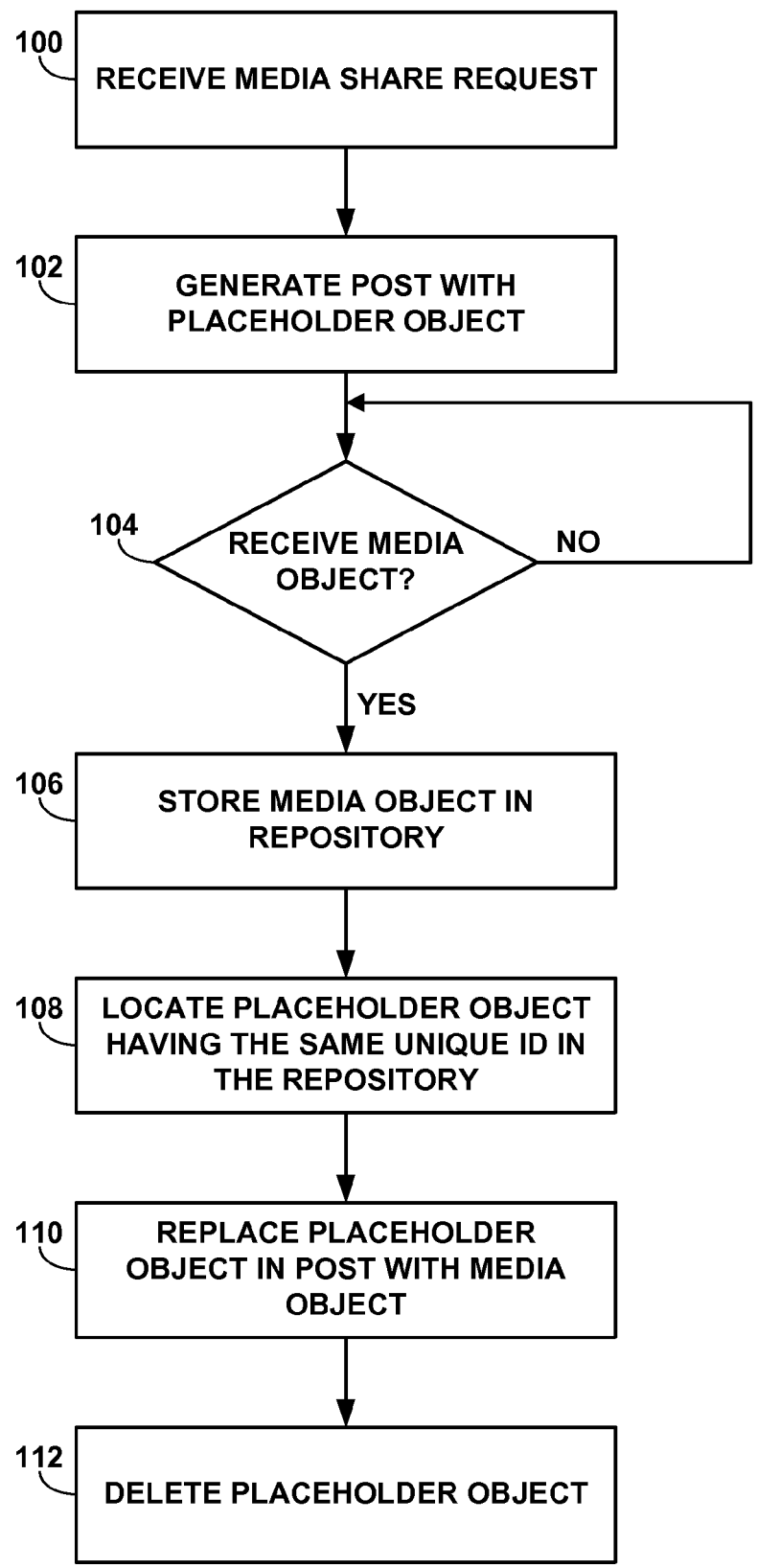
FIG. 6 is a flow diagram illustrating an example process that may be performed by one or more servers to replace a placeholder object in a network-accessible post with a media object based on a common unique identifier.

FIG. 6 is a flow diagram illustrating an example process that may be performed by one or more servers, such as one or more servers 26, to replace a placeholder object in a network-accessible post with media object 34 based on a common unique identifier. The process of FIG. 6 may be performed by one or more servers, but network server 26 will be described in this example. Network server 26 also includes one or more processors that may perform each of the steps in this process.

Network server 26 may initiate the generation of the network-accessible post upon receiving media share request 32 from computing device 12 via network 24 (100). Using the placeholder object, unique identifier, and any other information in media share request 32, network server 26 may store the placeholder object in repository 28 (or other storage device) and then generate the network-accessible post with the placeholder object (102). Since the placeholder object is not the intended media for the post, network server 26 may be configured to subsequently receive media object 34. As long as network server 26 has not received media object 34 ("NO" branch of block 104), network server 26 may continue to be prepared to receive media object 34. Although network server 26 may passively wait to receive media object 34, in other examples, network server 26 may actively look for media object 34 with the unique identifier matching the unique identifier associated with or otherwise provided with the placeholder object.

Once network server 26 receives media object 34 ("YES" branch of block 104), network server 26 may store media object 34 in repository 28 (106). Network server 26 may then locate or search for the placeholder object in repository 28 that is associated with the same unique identifier as that of media object 34 (108). Once the placeholder object is located, network server 26 locates the network-accessible post for the placeholder object and replaces the placeholder object of the post with media object 34 (110). Replacing the placeholder object may include replacing a reference to the placeholder object with a reference to media object 34 or uploading media object 34 to the post. Network server 26 may then delete the placeholder object (112) since the higher fidelity media object 34 is now included in the network-accessible post. In addition to replacing the placeholder object with media object 34, network server 26 may replace or otherwise reconcile the placeholder object stored in repository 28 with media object 34. One or more steps in the process of FIG. 5 may be optional, and in other examples, one or more additional steps may be added to this process consistent with the description herein.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
    generating, by a computing device, a unique identifier that identifies a media object and that is associated with a placeholder object, wherein the media object is of a higher fidelity than the placeholder object;
    generating, by the computing device, a media share request that commands a media sharing service to define a network-accessible post, wherein the media share request comprises the unique identifier and the placeholder object;
    transmitting, by the computing device, the media share request to the media sharing service;
    after initiating transmission of the media share request, transmitting, by the computing device, the media object and the unique identifier to the media sharing service;
    replacing the placeholder object in the network-accessible post with the media object based on the unique identifier once the media object has been received;
    upon replacing the placeholder object, deleting the placeholder object from the network-accessible post; and
    upon replacing the placeholder object, altering one or more characteristics of the network-accessible post as an indication of replacing the placeholder object in the network-accessible post with the media object.

2. The method of claim 1, further comprising:
    generating the media object by at least one sensor of the computing device.

3. The method of claim 1, further comprising:
    responsive to receiving a user request to generate the media share request, generating the placeholder object based on the media object.

4. The method of claim 1, wherein the media object is one of a still image, a video file, or an audio file.

5. The method of claim 1, wherein the placeholder object comprises an icon representative of the media object.

6. The method of claim 1, wherein the placeholder object comprises a reduced-resolution image with respect to the media object, and wherein the method further comprises:
    generating, by the computing device, the reduced-resolution image from the media object according to resolution requirements of the media sharing service.

7. The method of claim 1, wherein the unique identifier is distinctive with respect to any other unique identifier used by the media sharing service.

8. The method of claim 1, wherein generating the unique identifier comprises applying a hash function to the media object.

9. The method of claim 8, wherein the hash function is an MD5 cryptographic hash function.

10. The method of claim 1, wherein generating the unique identifier comprises combining a time and date at which the media object was generated and a media access control address of the computing device.

11. The method of claim 1, wherein transmitting the media object comprises initiating transmission of the media object to the media sharing service subsequent to completion of transmitting the media share request.

12. The method of claim 1, wherein transmitting the media object comprises detecting a high-speed network, connecting to the high-speed network, and, responsive to the connection, transmitting the media object to the media sharing service via the high-speed network.

13. The method of claim 12, wherein detecting the high-speed network comprises confirming that the high-speed network has been approved by a user of the computing device for transmitting the media object.

14. The method of claim 1, wherein the computing device is a mobile device, and wherein transmitting the media share request is performed via a wireless network.

15. A non-transitory computer-readable storage medium encoded with instructions that cause one or more processors of a mobile computing device to:
    generate a second image from a first image, wherein the first image is of a higher resolution than the second image;
    generate a unique identifier that identifies the first image and that is associated with the second image;
    generate a media share request that commands a media sharing service to define a network-accessible post, wherein the media share request comprises the unique identifier and the second image;
    transmit the media share request to the media sharing service;
    after initiating transmission of the media share request, transmit the first image and the unique identifier to the media sharing service;
    replace the second image in the network-accessible post with the first image based on the unique identifier once the first image has been received;
    wherein upon replacement of the second image, delete the replaced placeholder object is deleted from the network-accessible post; and
    upon replacement of the second image, alter one or more characteristics of the network-accessible post as an indication of replacement of the second image in the network-accessible post with the media object.

16. The non-transitory computer-readable storage medium of claim 15, wherein the instructions that cause one or more processors of the mobile computing device to generate the unique identifier further comprise instructions that cause the one or more processors of the mobile computing device to apply a cryptographic hash function to the first image to generate the unique identifier.

17. The non-transitory computer-readable storage medium of claim 15, wherein the instructions that cause one or more processors of the mobile computing device to transmit the first image further comprise instructions that cause the one or more processors of the mobile computing device to detect a high-speed network that has been approved by a user for transmitting the first image, connect to the high-speed network, and, responsive to the connection, transmit the first image to the media sharing service via the high-speed network.

18. A system comprising:
    a data repository configured to store media objects; and
    one or more servers configured to:
        receive, via a network, a media share request comprising a placeholder object and a unique identifier, wherein the unique identifier is associated with the placeholder object and identifies a media object, and wherein the media object is of a higher fidelity than the placeholder object;

responsive to receiving the media share request, generate a network-accessible post comprising the placeholder object;

subsequent to receiving the media share request, receive, via the network, the media object and the unique identifier;

store the associated media object in the data repository;

replace the placeholder object in the network-accessible post with the media object based on the unique identifier;

upon replacing the placeholder object with the media object in the network-accessible post, delete the placeholder object from the network-accessible post; and upon replacing the placeholder object, alter one or more characteristics of the network-accessible post as an indication of replacing the placeholder object in the network-accessible post with the media object.

19. The system of claim 18, wherein the one or more servers are configured to:

recognize that the unique identifier associated with the placeholder object is the same as the unique identifier received with the media object; and responsive to the recognition, replace the placeholder object in the network-accessible post with the media object.

20. The system of claim 18, further comprising a storage device configured to store the placeholder object, wherein the one or more servers are configured to delete the placeholder object from the storage device when replacing the placeholder object with the media object.

21. The system of claim 18, wherein the media object is one of a still image, a video file, or an audio file.

22. The system of claim 18, wherein the placeholder object is one of an icon representative of the media object or a reduced-resolution media object generated from the media object.

* * * * *